US006732288B2

(12) United States Patent
de la Iglesia et al.

(10) Patent No.: US 6,732,288 B2
(45) Date of Patent: *May 4, 2004

(54) BUS POWER SAVINGS USING SELECTIVE INVERSION IN AN ECC SYSTEM

(75) Inventors: Erik A. de la Iglesia, Mountain View, CA (US); Pochang Hsu, Milpitas, CA (US); Rajendra M. Abhyankar, Santa Clara, CA (US); Siripong Sritanyaratana, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/236,338

(22) Filed: Sep. 6, 2002

(65) Prior Publication Data

US 2003/0066005 A1 Apr. 3, 2003

Related U.S. Application Data

(62) Division of application No. 09/410,380, filed on Sep. 30, 1999, now Pat. No. 6,490,703.

(51) Int. Cl.$^7$ .............................. G06F 1/26; G06F 1/32; H02H 3/05
(52) U.S. Cl. ............................. 714/2; 714/52; 711/103; 713/320
(58) Field of Search .................................. 714/746, 752, 714/761, 762, 764, 753, 754, 755, 777, 785, 6, 52, 2; 711/103; 365/202, 230.03; 713/320

(56) References Cited

U.S. PATENT DOCUMENTS

| 4,661,955 A | 4/1987 | Arlington et al. ............... 714/6 |
| 5,644,583 A | 7/1997 | Garcia et al. ............... 714/764 |
| 6,292,868 B1 | 9/2001 | Norman ...................... 711/103 |

OTHER PUBLICATIONS

Mircea R. Stan & Wayne P. Burleson, "Bus–Inveert Coding for Low–Power I/O," 3 IFEE Trans. On VLSI Systems 49 (Mar. 1995).

Mircea R. Stan, "Low Power Encoding for VLSI and ECC Duals", 1998 IEEE International Symposium, pp. 19.

*Primary Examiner*—Emmanuel L. Moise
(74) *Attorney, Agent, or Firm*—Blakely, Sokoloff, Taylor & Zafman LLP

(57) ABSTRACT

The present invention relates to an error correction and selective inversion circuit (ESIC). The ESIC includes a power-on logic state (POLS) bus having a data signal and an error code correction (ECC) generator having an input coupled to the POLS bus. The ECC generator includes one or more correction pins. The ESIC also includes an inversion generator having an input attached to the POLS bus in parallel with the ECC generator. The output of the inversion generator is integrated with the output of on or more correction pins from the ECC generator so as to form an inverted data signal output. An inverted data signal is recovered by the ESIC in an inversion recovery.

16 Claims, 6 Drawing Sheets

BUS POWER SAVINGS USING SELECTIVE INVERSION IN AN ECC SYSTEM

CROSS REFERENCE TO RELATED APPLICATIONS

This divisional application claims the benefit of U.S. patent application Ser. No. 09/410,380 filed Sep. 30, 1999, U.S. Pat. No. 6,490,703, for Bus Power Savings Using Selective Inversion in an ECC System, to inventors Erik A. De La Iglesia, Pochang Hsu, Rajendra M. Abhyankar, and Siripong Sritanyaratana, Assignee Intel Corporation.

BACKGROUND OF THE INVENTION

1. Field of the Invention

The invention generally relates to bus power savings by using selective inversion technology in a system employing an error correction code (ECC) encoder.

2. Background Information

Electronic products may be thought of as those products that involve the controlled conduction of electrons or other charge carriers. Examples of electronic products include radios, desktop and laptop computers, work stations, and servers as well as those involved in high-end networking and storage technology. Just about all electronic products employ one or more microprocessors located on a printed circuit board. These microprocessors engage a computer operating system as well as applications.

Processors are conventionally coupled to a memory through a memory interface. Data is transferred from the processor to the memory through the memory interface where that data is stored in memory until requested. When that data is requested, the data is transferred from the memory by the processor. The process of transferring data to and from the memory requires time. As the time to transfer the data to and from the memory is decreased, processor speed is increased. Thus, it is highly desirable to increase the transfer speed of data to and from the memory.

Data is transferred within a computer in a signal composed of a string of logic one and logic zero bits whereby a one or zero represent the state of the logic of a single bit. Conventionally, zero volts represents a logic zero bit and five volts represents a logic one bit. In a string of logic one and logic zero bits, the numeric voltage change between an adjacent logic one and logic zero is referred to as the swing level. Since it takes less time to generate a small voltage change than it does to generate a large voltage change for a given loading, a universal approach to achieve higher data transfer speeds is to reduce signal swing level from five volts to something less.

Complementary Metal Oxide Semiconductor (CMOS) is a semiconductor fabrication technology using a combination of n- and p-doped semiconductor material to achieve low power dissipation. To achieve higher data transfer speeds in CMOS circuits, Gunning Transceiver Logic (GTL) is extensively used. GTL is a standard for electrical signals where the GTL signal represents the state of the logic of the data. In a GTL signal, the signal swings between 0.4 volts and 1.2 volts with a reference voltage centered about 0.8 volts (800 millivolts). Since only a deviation of at most about 0.4 volts from the central or reference voltage of 0.8 volts is required to drive the state of the logic from logic zero to logic one or logic one to logic zero, a GTL signal is a low voltage swing logic signal. GTL signaling may also be implemented as active low, whereby a low voltage (0.4V) is used to represent a logic one and a high voltage (1.2V) is used to represent a logic zero. Gunning Transceiver Logic has several advantages. The resistive termination of a GTL signal provides a clean signaling environment. Moreover, the low terminating voltage of 1.2 volts results in reduced voltage drops across the resistive elements. Thus, the primary advantage of a GTL signal is that it can operate at a very high frequency. Furthermore, since the swing is low, electromagnetic interference (EMI) can be contained.

A problem with GTL technology is the relatively high consumption of electrical power needed to operate GTL technology. A System using active low GTL technology consumes insignificant power when the state of the logic of the data signal is logic zero since the power used is negligible. However, when the state of the logic is logic one, the system consumes a large quantity of power. Rambus technology is similar to GTL technology in that Rambus systems, developed by Rambus, Inc. of Mountain View, Calif., consume significant power only when the signals are in one of the two logic states. Both Rambus and GTL technology systems may be view as power-on logic state systems as they both consume significant power when the logic is in one of two states.

Consumption of power translates into higher costs and diminishes the useful life of components within an electrical system. This is especially true for desktop and laptop personal computers. Thus, it is desirable to reduce the amount of power consumed by devices employing power-on logic state buses.

SUMMARY OF THE INVENTION

The present invention relates to an error correction and selective inversion circuit (ESIC). The ESIC includes a power-on logic state (POLS) bus having a data signal and an error code correction (ECC) generator having an input coupled to the POLS bus. The ECC generator includes one or more correction pins. The ESIC also includes an inversion generator having an input attached to the POLS bus in parallel with the ECC generator. The output of the inversion generator is integrated with the output of on or more correction pins from the ECC generator so as to form an inverted data signal output. An inverted data signal is recovered by the ESIC in an inversion recovery.

DETAILED DESCRIPTION OF THE INVENTION

In a preferred embodiment, the invention saves power in systems where power consumption is high during a logic one state by inverting the data signal when the number of bits at the logic one state in that data signal exceed fifty percent of the total number of bits. By flipping the logic one bits when the number of logic one bits exceed fifty percent of the total number of bits, the number of logic one bits becomes less than fifty percent of the total number of bits. The power savings approximately is derived from the difference between the power consumption for the initial number of logic one bits and the power consumption for the selectively inverted number of logic one bits. A similar savings is true for systems where power consumption is on during a logic zero state.

Most computer systems employ some form of an error correction code (ECC) encoder and syndrome generator system. To efficiently invert data bits where power consumption is on during a logic one state, an embodiment of the invention uses existing correction bits available to an error correction code encoder and syndrome generator system by employing the eight correction bits in conjunction with an inversion generator. When coupled to a selecting device, an error correction code encoder and inversion generator may form an ESIC circuit—an Error correction and Selective Inversion Circuit. Embodiments of the ESIC circuit are set out below.

Figure 1:
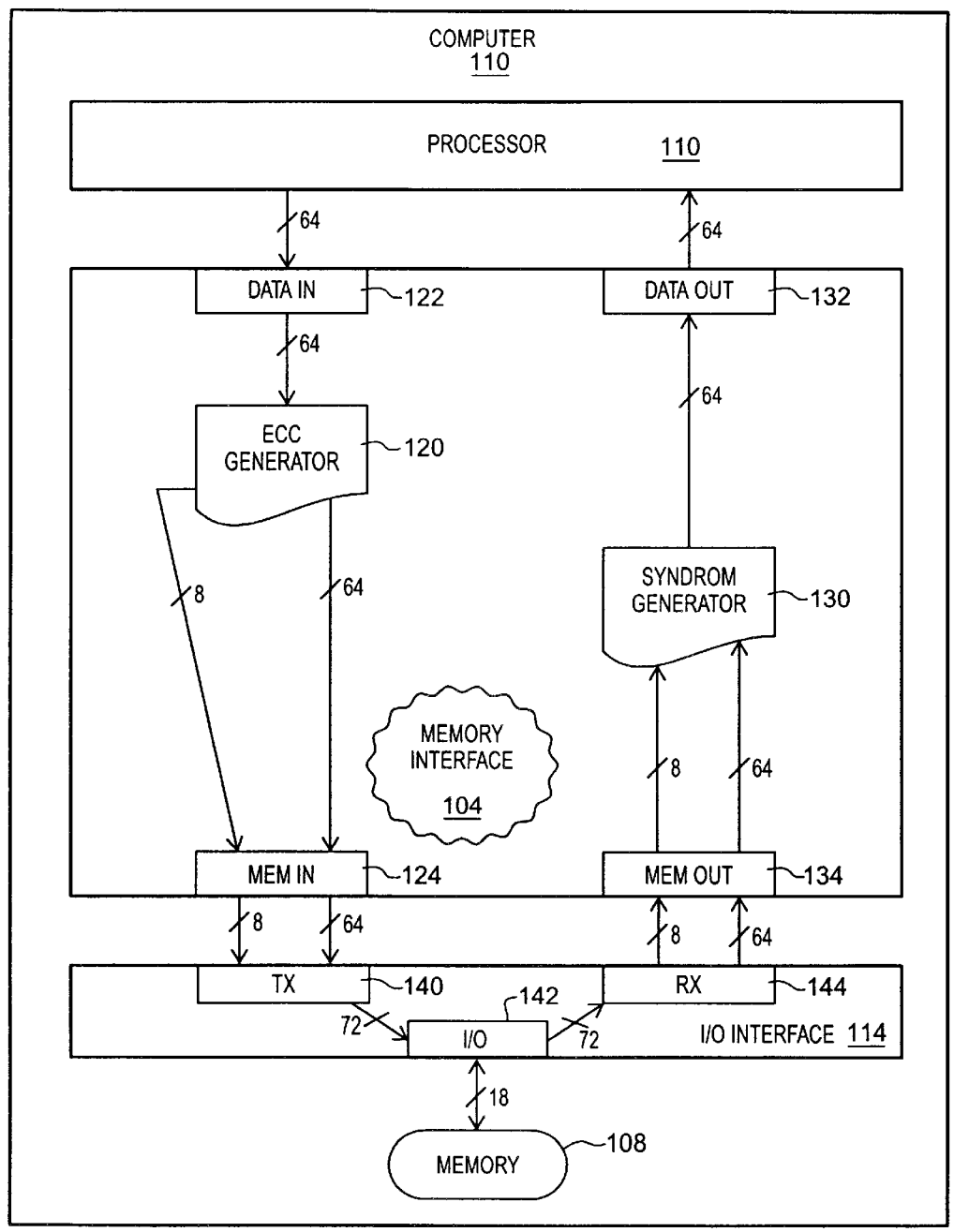
FIG. 1 illustrates conventional computer 100 having memory interface 104 residing between memory 108 and processor 110.

FIG. 1 illustrates conventional computer 100 having memory interface 104 residing between memory 108 and processor 110. I/O interface 114 may reside between memory interface 104 and memory 108. In connection with the data signals sent through I/O interface 114, I/O interface 114 may work to deserialize seventy two bits into four sets of eighteen bits and to serialize the four sets of eighteen bits into seventy two bits.

Memory interface 104 includes error correction code (ECC) generator 120 coupled between data in port 122 and memory in port 124. ECC generator 120 may be a hypercube-based Error Correction Code encoder. Memory interface 104 also includes syndrome generator 130 coupled between data out port 132 and memory out port 134. I/O interface 114 includes transmit (TX) port 140 for transmitting encoded data to I/O port 142 and receive (RX) port 144 for receiving encoded data from I/O 142. I/O 142 couples memory 108 to I/O interface 114.

In operation, a request is generated within processor 110 of FIG. 1 to send data to memory 108. Conventionally, the data is placed into one or more data packets that are each sixty four bits wide. The data travels from processor 110 into ECC generator 120 through data in port 122. Within ECC generator 120, eight correction bits are added to the sixty four bit wide data prior to that data being stored in computer memory 108. The corrected bits contain binary numerical data that represents segments of the sixty four bit binary value prior to that data being stored in computer memory 108. Thus, the hardware for ECC generator 120 includes at least seventy two pins, eight of which are dedicated to corrected bits.

Data resides in memory 108 over time until requested by processor 110. The time may be anywhere from less than a microsecond to an indefinitely long period of time during which the computer is turned on. During this time, the bits in the data may degrade by flipping their logic state. For example, one bit of the sixty four bits of data may have flipped due to a cosmic radiation particle impacting the magnetic material representing that one bit. Another cause may be from radiation originating from the components' packaging materials.

The flipping of the one bit noted above is viewed as a soft error in the sixty four bits of data. An error may be viewed as a discrepancy between a measured value or condition and the true, specified, or theoretically correct value or condition. The two types of memory errors in a random access memory (RAM) (especially in dynamic RAM—DRAM) are "soft" errors due to radiation-induced bit switching, and "hard" errors due to the unexpected deterioration of a memory chip. Soft errors do not indicate lasting damage to a memory board, but they do corrupt programs or data. Hard errors require physical replacement of the memory device. Single bit memory failures are the most common type of error. A hard single bit failure, such as that caused by a completely dead chip can be corrected by error detection and correction (EDAC) if each chip supplies only one bit of each word. EDAC memory is the most common level of protection for minicomputers and mainframes whereas the cheaper parity protection is more common in microcomputers. Since there is no way to eliminate soft or hard errors, designers protect against them by using conservative design rules.

EDAC may be viewed as a collection of methods to detect errors in transmitted or stored data and to correct them. Also referred to as error checking and correction, EDAC may be performed in many ways, all of them involving some form of coding. The simplest form of error detection is a single added parity bit or a cyclic redundancy check. Multiple parity bits can not only detect that an error has occurred, but also which bits have been inverted, and should therefore be re-inverted to restore the original data. The more extra bits are added, the greater the chance that multiple errors will be detectable and correctable.

Several codes can perform Single Error Correction, Double Error Detection (SECDEC). One of the most commonly used is the Hamming code. In the Hamming code, extra, redundant bits are added to stored or transmitted data for the purposes of error detection and correction. The Hamming codes provide a great improvement in the reliability of data from distant space probes, where it is impractical, because of the long transmission delay, to correct errors by requesting retransmission. RAM which includes EDAC circuits is known as error correcting memory (ECM).

Returning to FIG. 1, on receiving a request to retrieve the data stored in memory 108, the stored data along with its correction bits are directed to syndrome generator 130 of FIG. 1. In error detecting and correcting (EDAC) systems, the eight correction bits are used for one of three purposes: (i) if no errors are detected, syndrome generator 130 returns the correct data; (ii) if one error is detected, syndrome generator 130 uses the eight correction bits to correct this error without the awareness of the computer user. After correcting a soft error on the fly, syndrome generator 130 returns corrected data to data out port 132; and (iii) if two or more errors are detected, syndrome generator 130 returns an error signal such as by stalling the operating system or displaying a blue screen. On receiving stored data along with its correction bits, syndrome generator 130 uses the eight correction bits to detect and perhaps correct errors within the stored data prior to sending the requested data to data out port 132.

As noted above, an embodiment of the invention uses correction bits of an error correction code encoder and syndrome generator system in conjunction with an inversion generator to achieve power savings in power-on logic state (POLS) systems. In particular, an embodiment employs selective bus inversion for the inversion generator.

In bus invert coding, power is consumed when signals flip. Bus invert coding is employed in power-on logic flip (POLF) buses. The determination to flip is made by comparing previous data to present data. However, in selective bus inversion, power is consumed when signals are at a particular logic state, not each time they flip. Thus, selective bus inversion may be employed in power-on logic state (POLS) buses. The determination to flip in selective bus inversion is made by comparing the number of logic state bits of the present data to the total number of bits in the present data. If more than half of the bits are logic one, the entire data string may be flipped. Where a data string or segment of a data string is flipped, that pre-flipped portion may be referred to as an excessive power consuming data string or data segment as the case may be.

Figure 2A:
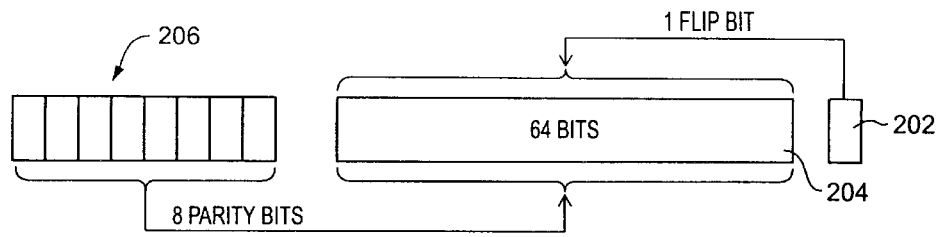
FIG. 2A illustrates the inversion state of sixty four bit word 204 as represented by additional flip bit 202.

Words of data conventionally are processed in sixty four or one hundred twenty eight bits, depending on the operating system. To flip a sixty four bit word in a power-on logic state bus using one inversion or "flip" bit (one I/O pin), the entire sixty four bits would need to be reviewed in the collective to determine whether there was greater than fifty percent logical one bits in the word. An example of this is shown in FIG. 2A. FIG. 2A illustrates the inversion state of sixty four bit word 204 as represented by additional flip bit 202. In a system employing ECC encoder and decoder scheme with an additional bit, the eight ECC correction (or parity) bits, here bits 206, may continue to be used to indicate the sixty four bit word 204 in a corrected state due to the presence of an additional bit that may be dedicated to inversion.

Figure 2B:
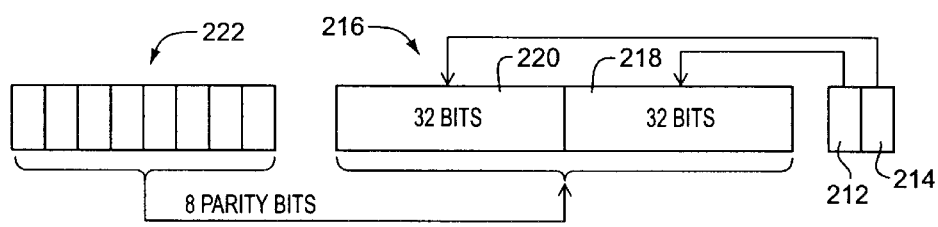
FIG. 2B illustrates the inversion state of sixty four bit word 216 as represented by additional flip bit 212 and additional flip bit 214.

A greater power savings can be obtained by employing two flip bits. By using two flip bits (two I/O pins), each flip bit would be responsible for the potential flip of thirty two bits of a sixty four bit word. FIG. 2B illustrates the inversion state of sixty four bit word 216 as represented by additional flip bit 212 and additional flip bit 214. Again, in a system employing ECC encoder and decoder scheme, eight correction (or parity) bits 222 of FIG. 2B may continue to be used to indicate the sixty four bit word 216 in a corrected state.

Additional flip bit 212 of FIG. 2B represents the inversion state of thirty two bit word segment 218 of sixty four bit word 216 and additional flip bit 214 represents the inversion state of thirty two bit word segment 220. Thus, if bits zero through thirty one [0 . . . 31] of thirty two bit word segment 218 had greater than fifty percent logical one bits and bits thirty two through sixty three [32 . . . 63] of thirty two bit word segment 220 had less than fifty percent logical one bits, only thirty two bit word segment 218 [0 . . . 31] would need to be flipped. In this POLS example, thirty two bit word segment 220 [32 . . . 63] already is at minimum power consumption.

If the single flip bit scheme of FIG. 2A were employed in the above example and there was greater than fifty percent logical one bits in word 216 of FIG. 2B, thirty two bit word segment 220 would be flipped along with thirty two bit word segment 218. Flipping thirty two bit word segment 218 places thirty two bit word segment 218 in a minimum power consumption state. However, flipping thirty two bit word segment 220 would change thirty two bit word segment 220 from a minimum power consumption state to maximum power consumption state. Thus, the single flip bit scheme of FIG. 2A results in diminished power savings over the dual flip bit scheme of FIG. 2B.

In general, less power is consumed as the number of flip bits employed increases. However, each flip bit adds a small amount of power itself. The most power efficient inversion scheme would be constructed so as to optimize the number of flip bits for the given width of the bus. However, this increased granularity has its costs. Each additional pin in a chip package includes up front manufacturing costs such as design and product costs. In other words, there is a trade off between the up front cost of additional pins such as seen in FIG. 2A and FIG. 2B and total power savings over the life of the chip package.

In one embodiment of the invention, the invention adds extra pins to a sixty four pin chip package or a one hundred twenty eight pin chip package as part of modern bus technology. Examples may be derived from FIG. 2A and FIG. 2B. Data bus for the data word may include a set of pins where that set of pins includes $2^n$ pins, where n is any positive integer. The data bus may have two pins, four pins, eight pins, sixteen pins, thirty two pin, sixty four pins, one hundred twenty eight pins, etc. The invention also adds extra pins to each of these pin chip packages.

In a one hundred and twenty eight pin package, the addition of one, two, three, or four pins is fairly insignificant compared to that large number of pins. Thus, in such a package, four to eight pins dedicated to flip bits are preferred. In respect of this observation, a preferred embodiment of the invention implements selective inversion in a power-on logic state (POLS) bus without the costs involved in employing additional pins such as seen in FIG. 2A and FIG. 2B.

The preferred embodiment avoids adding extra pins to a chip package by employing the correction bit pins in an ECC system. As noted above, for any memory system with ECC, there exists eight correction bits for each sixty four bit word. Moreover, if one error is detected, syndrome generator 130 of FIG. 1 may use the eight correction bits to correct this error. By using some of the ECC correction pins, the invention gives up this ability to detect one error and correct one error, leaving only the ability to detect one error in the ECC system. What is gained by giving up the ability to detect one error and correct one error for the ability to detect one error is power savings in the form of a reduction in power consumption. This is especially keen since the reduction in power consumption is achieved in the preferred embodiment without the additional up front costs associated with additions dedicated flip bit pins.

Figure 2C:
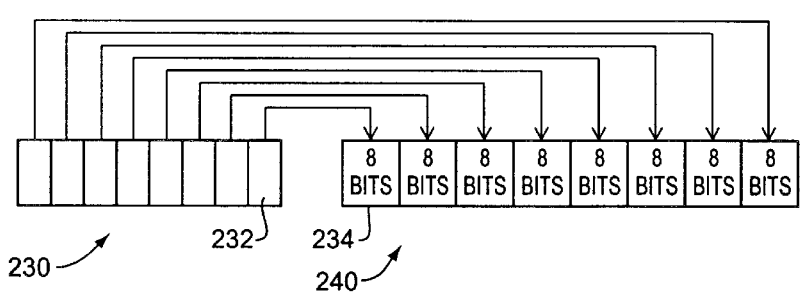
FIG. 2C illustrates an eight flip bit ESIC system with zero error detection and no correction.

In low end computer applications such as a desktop or laptop computer having an ECC system, error correction is not critical. Thus, all eight correction bits of their ECC systems may be employed as part of an Error correction and Selective Inversion Circuit (ESIC). FIG. 2C illustrates an eight flip bit ESIC system with zero error detection and no correction. The inversion state of sixty four bit word 240 is represented by flip bits 230. Flip bits 230 of FIG. 2C are the correction bits from an ECC generator, such as ECC generator 120 of FIG. 1. In this embodiment, flip bit 232 represents the inversion state of eight bit word segment 234 of sixty four bit word 240.

Figure 2D:
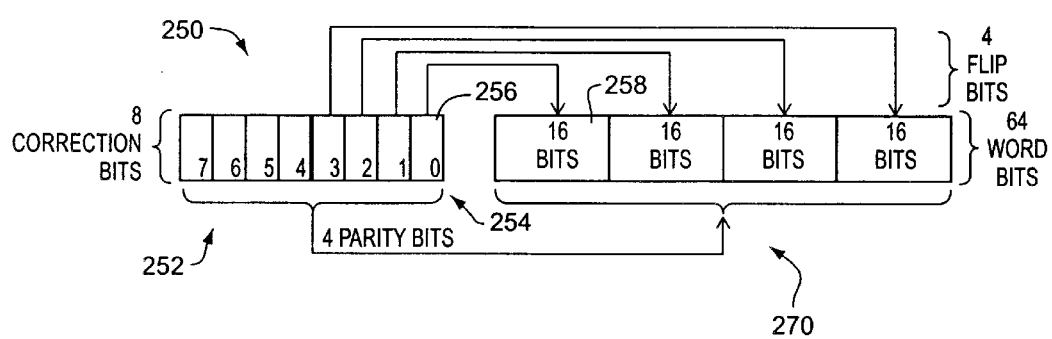
FIG. 2D illustrates a four flip bit ESIC system with one error detection and no correction.

FIG. 2D illustrates a four flip bit ESIC system with one error detection and no correction. Four of eight correction bits 250 may be integrated into an ESIC system as four flip bits 254, with the remaining four correction bits 252 used for error detection without correction. In this embodiment, flip bit 256 represents the inversion state of sixteen bit word segment 258 of sixty four bit word 270. The distribution of correcting bits zero through seven [0 ... 7] to four flip bits 254 may be base on design and implementation criteria of the art. For example, although correcting bits zero, one, two, and three [0 ... 3] are allocated as flip bits 254 in FIG. 2D, correcting bits such as one, three, four, and seven [1, 3, 4, 7] may be allocated as flip bits 254.

Figure 3:
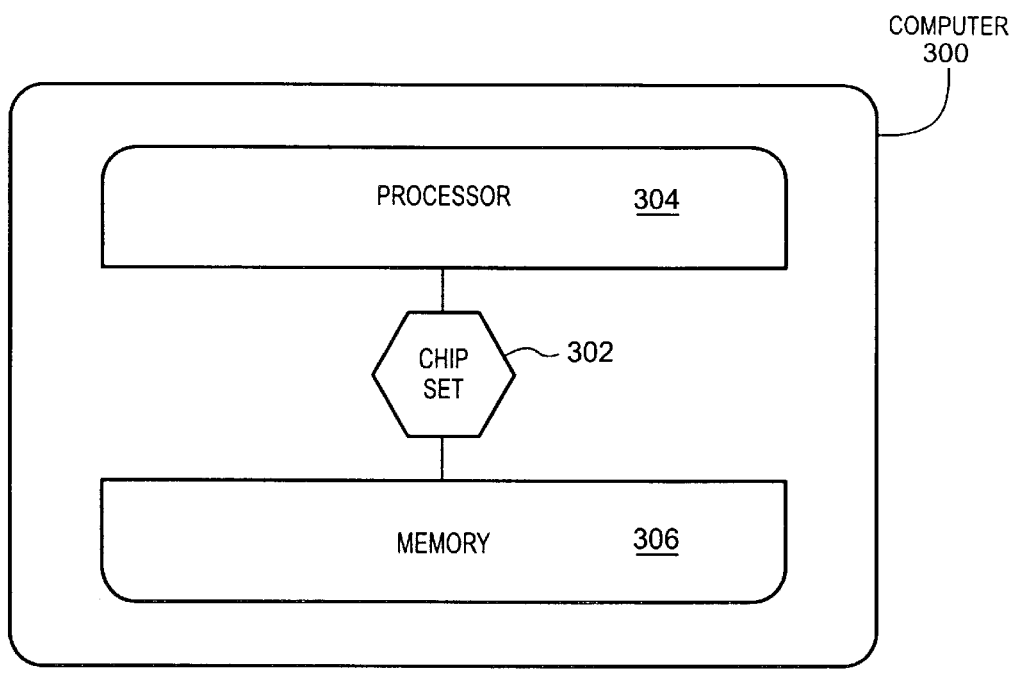
FIG. 3 illustrates chip set 302 of the invention employed in computer 300.

FIG. 3 illustrates chip set 302 of the invention employed in computer 300. As shown, chip set 302 preferably is coupled between processor 304 and memory 306. Processor 304 may be any microprocessor that contributes to the control all the other parts of computer 300. Processor 304 may be an I/O processor. Memory 306 may be any device that can hold data in a machine-readable format. Memory 306 may also be any device having use for error correction, including a device other than that which can hold data in a machine-readable format such as a radio receiver. Memory 306 need not be located within computer 300. Memory 306 may be coupled to chip set 302 through radio signals.

As noted above, chip set 302 may serve as an interface between a processor and other devices within computer 300 or external to computer 300. Moreover, chip set 302 may be any collection of integrated circuits that are designed to be used together for some specific purpose, for example control circuitry in a personal computer. As one example, FIG. 4 illustrates chip set 302 including memory interface 400 of the invention.

Figure 4:
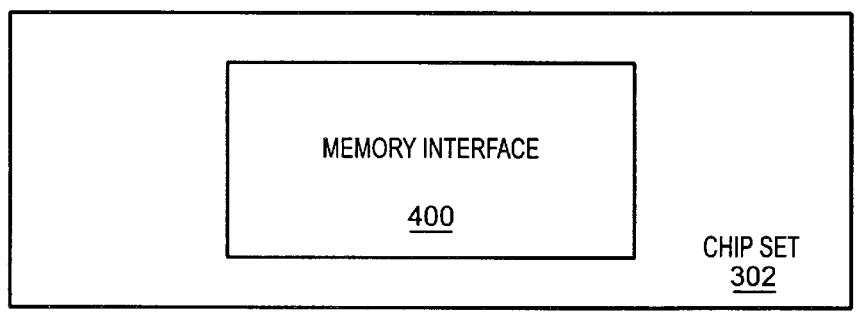
FIG. 4 illustrates chip set 302 including memory interface 400 of the invention.
Figure 5:
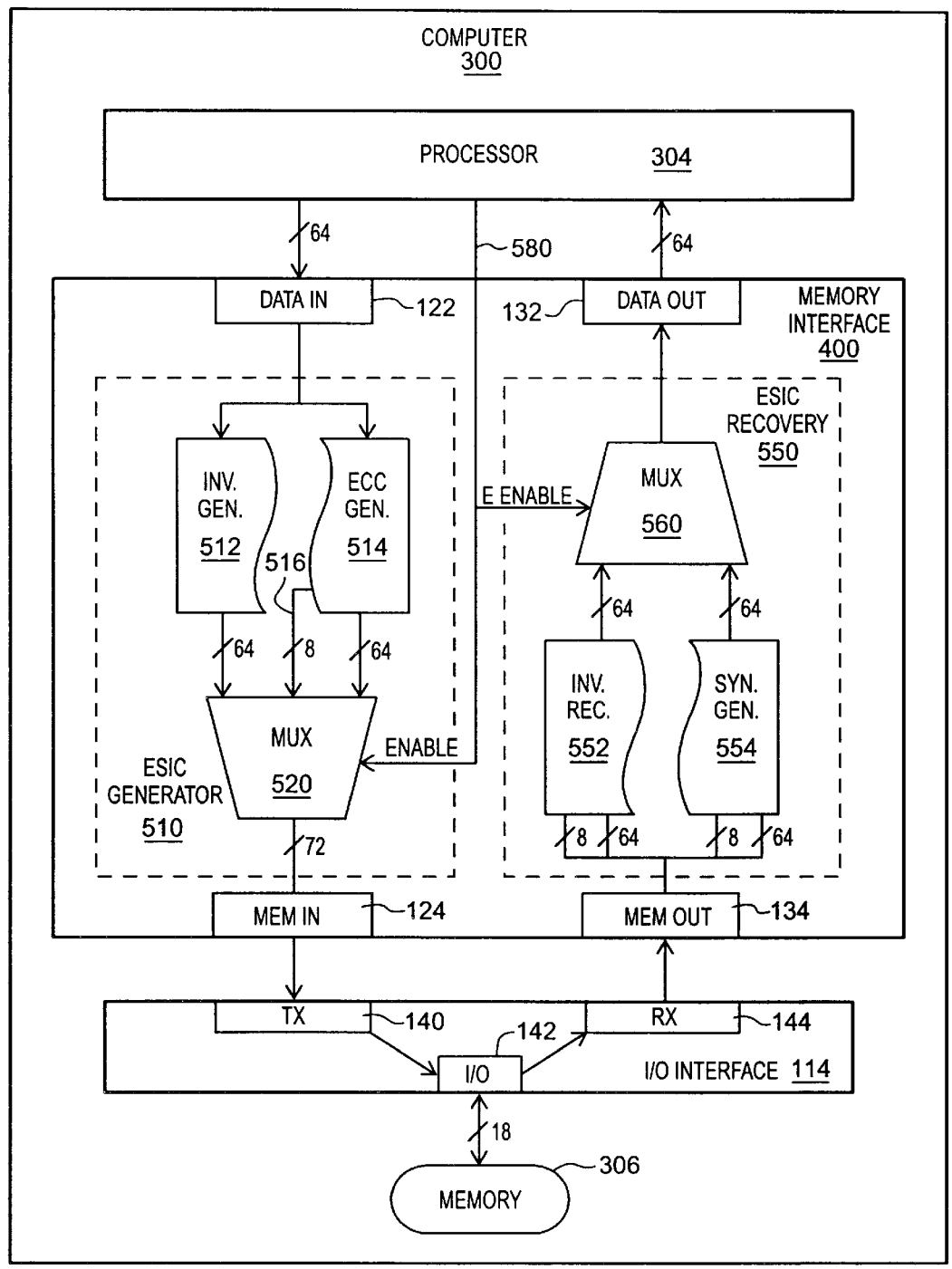
FIG. 5 is a detailed view of memory interface 400 of FIG. 4.

FIG. 5 is a detailed view of memory interface 400 of FIG. 4. As shown in FIG. 5, coupled between data in port 122 and memory in port 124 is ESIC generator 510 (illustrated by dashed lines). Coupled between memory out port 134 and data out port 132 is ESIC recovery 550.

ESIC generator 510 preferably includes inversion generator 512 coupled in parallel to ECC generator 514. With inversion generator 512 coupled in parallel to ECC generator 514, inversion generator 512 may employ one or all of correction bits 516. Preferably correction bits 516 comprise eight correction bits but may include any where from one to hundreds of correction bits. Inversion generator 512 is discussed in more detail in connection with FIG. 6.

An enable device such as multiplexer (MUX) 520 may be provided with ESIC generator 510 to permit a user to enable inversion by allocating correction bits 516 between inversion generator 512 and ECC generator 514. Enable bus 580 may transmit an enable/allocation signal to MUX 520. The output of MUX 520 would be seventy two bits if the input were a sixty four bit word, four flip bits, and four parity or correcting bits. MUX 520 may also be omitted where correction bits 516 are allocated through, for example, hardwiring.

ESIC recovery 550 preferably includes inversion recovery 552 coupled in parallel to syndrome generator (or ECC correction) 554. Inversion recovery 552 is discussed in more detail in connection with FIG. 7. ESIC recovery 550 may also include MUX 560 coupled between data out port 132 and the outputs of inversion recovery 552 and syndrome generator 554. With inversion recovery 552 coupled in parallel to syndrome generator 554, enable bus 580 may transmit an enable/allocation signal to MUX 560 based on the allocation of correction bits 516 in ESIC generator 510. MUX 560 may be omitted where correction bits 516 are allocated through, for example, firmware.

Figure 6:
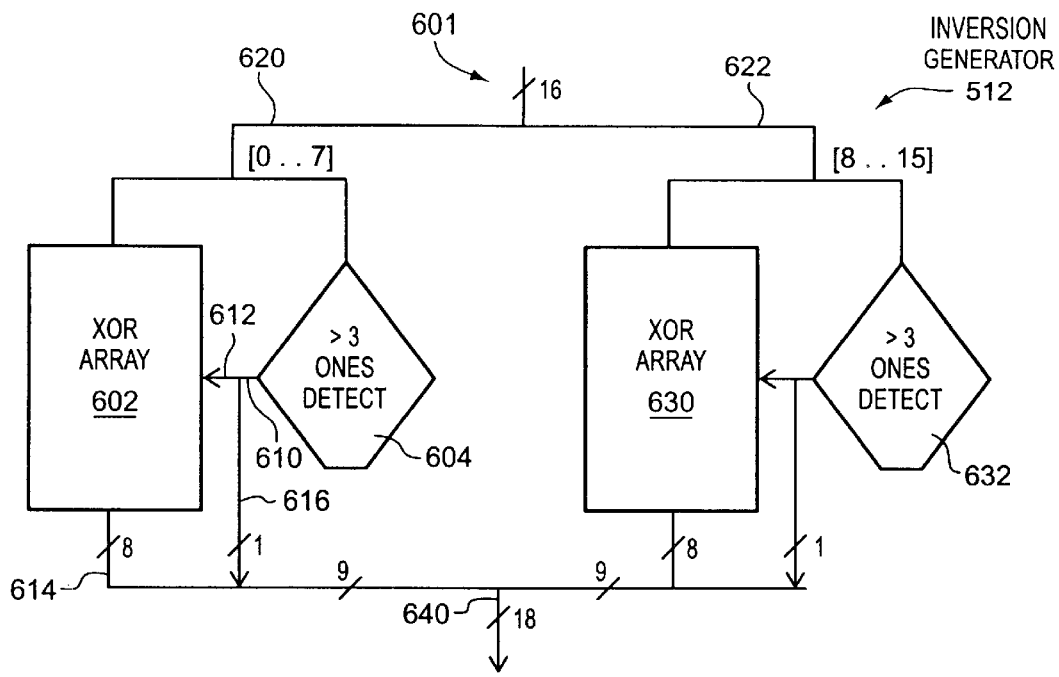
FIG. 6 is an eight bit granularity block diagram of inversion generator 512 of FIG. 5.

FIG. 6 is an eight bit granularity block diagram of inversion generator 512 of FIG. 5. The block diagram illustrates part of an eight flip bit ESIC system with zero error detection and no correction as seen in FIG. 2C. Coupled in parallel to XOR array 602 is logic ones detector 604. Array 602 may be any array capable of flipping the input signal. A preferred example is an XOR array. Logic ones detector 604 is a greater than three (">3") logic ones detector for reasons discussed below. Signal flip bit line 610 is coupled to XOR array 602 through line 612 and coupled to output bus 614 of XOR array 602 through line 616. Flip bit line 610 preferably is associated with one of the eight correction bit pins 516 from ECC generator 514 of FIG. 5.

Bus 601 divides into bus 620 and bus 622 so as to divide the bits of an input signal on bus 601 into two sets of bits (dividing device not shown). Bus 620 sends the same signal to the inputs of XOR array 602 and logic ones detector 604. Bus 622 sends the same signal to the inputs of XOR array 630 and logic ones detector 632. XOR array 630 and logic ones detector 632 are set up similarly to XOR array 602 and logic ones detector 604.

Inverting an excessive power consuming data segment is timing critical. Preferably, the inversion is accomplished as fast or faster than the time it takes to perform error correcting. If inversion generator 512 of FIG. 5 takes less time than ECC generator 514 of FIG. 5, then this embodiment will add no overall time costs to the operating system of computer 300.

As noted above, to perform selective inversion, the population of logic ones in an POLS system or the population of logic zeros in a POLF system need to be counted. In the case of FIG. 6, sixteen bits of a sixty four bit word enter line 601 and are further divided (device not shown) into two segments of eight bits each. If five or more of the eight bits [0 ... 7] on bus 620 are logic one, the eight bit segment is inverted. The same is true for eight bits [8 ... 15] on bus 622. If four of the eight bits are logic one, no power savings will occur if the segment is flipped. However, since it is quicker to locate greater than three logic ones within an eight bit segment than it is to locate greater than four logic ones in that same segment, the invention employs a detector the detects greater than three logic ones. Under similar reasoning, a greater than seven logic ones detector may be used in the four granularity system of FIG. 2D.

To invert the eight bits [0 ... 7] on bus 620 of FIG. 6, logic ones detector 604 sends a flip signal along line 612 to XOR array 602. Logic ones detector 604 also sends a signal along line 616 as an indication of the flip status of the signal initially residing on bus 620. The eight bit output 614 of XOR array 602 joins the one bit output 616 of logic ones detector 604 to form nine bits. These nine bits join with the nine bits output from XOR array 630 and logic ones detector 632 to form an eighteen bit signal on line 640 of FIG. 6. These eighteen bits combine with three other sets of eighteen bits in the output of MUX 520 seen in FIG. 5 to form a seventy two bit word that includes the sixty four bits of inverted data.

Figure 7:
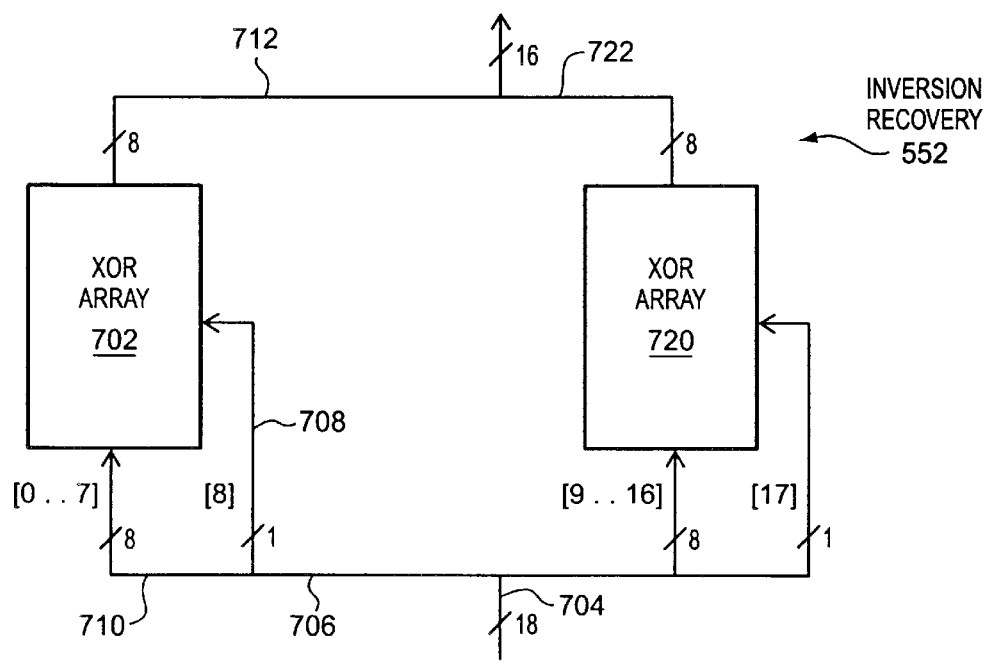
FIG. 7 is a block diagram of inversion recovery 552 of FIG. 5.

FIG. 7 is a block diagram of inversion recovery 552 of FIG. 5. To recover an inverted data segment, the invention employs an inverting array such as XOR array 702. Data and flip bits are received on bus 704 of FIG. 7 and separated (device not shown) into a plurality of segments, preferably one segment for each flip bit. As the data and flip bit travel along bus 706, the flip bit (preferably the eighth bit [8] of the data segment) enters XOR array 720 along line 708 and the data (bits zero through seven [0 ... 7]) enter XOR array 702 along bus 710 (separation device not shown). Data along bus 710 will be flipped by XOR array 702 depending on the flip bit of line 708. For example, if the flip bit of line 708 is a logic one, then the data along line 710 will flip. Whether flipped or not, the eight bits of data [0 . . . 7] exit XOR array 702 along bus 712 as the original data and are combined with the eight bits of data [9 . . . 16] along bus 722 so as to contribute to the data output such as from data out port 132 of FIG. 5 to form sixty four bits of recovered data.

There are many ways to invert an eight bit data segment in a POLS system where power is on at logic state one. For example, logic ones detector 604 may look for greater than three logic ones, greater than four logic ones, less than five logic zeros, and less than four logic zeros. Logic ones detector 604 may also be implemented so as to not flip the data segment if there are less than four logic ones. Each of these population counters is a function of implementation.

Through a software application of the invention, a computer user may allocate correction bits 516 of FIG. 5 between ECC and selective inversion. This may be done by maintaining inversion generator 512 structurally separate from ECC generator 514 or by sharing bits 516 in a single integrated circuit chip through overlap in the design of ESIC generator 510. Allocation of correction bits 516 are at least a function of the degree of importance error correction is to the use a user makes of computer 300. The software application may be a control panel application offering a scaled power savings option that includes maximum power savings as represented by the allocation of all eight correction bits to selective inversion. A change in correction bit allocation may take place after rebooting the operating system.

Figure 8:
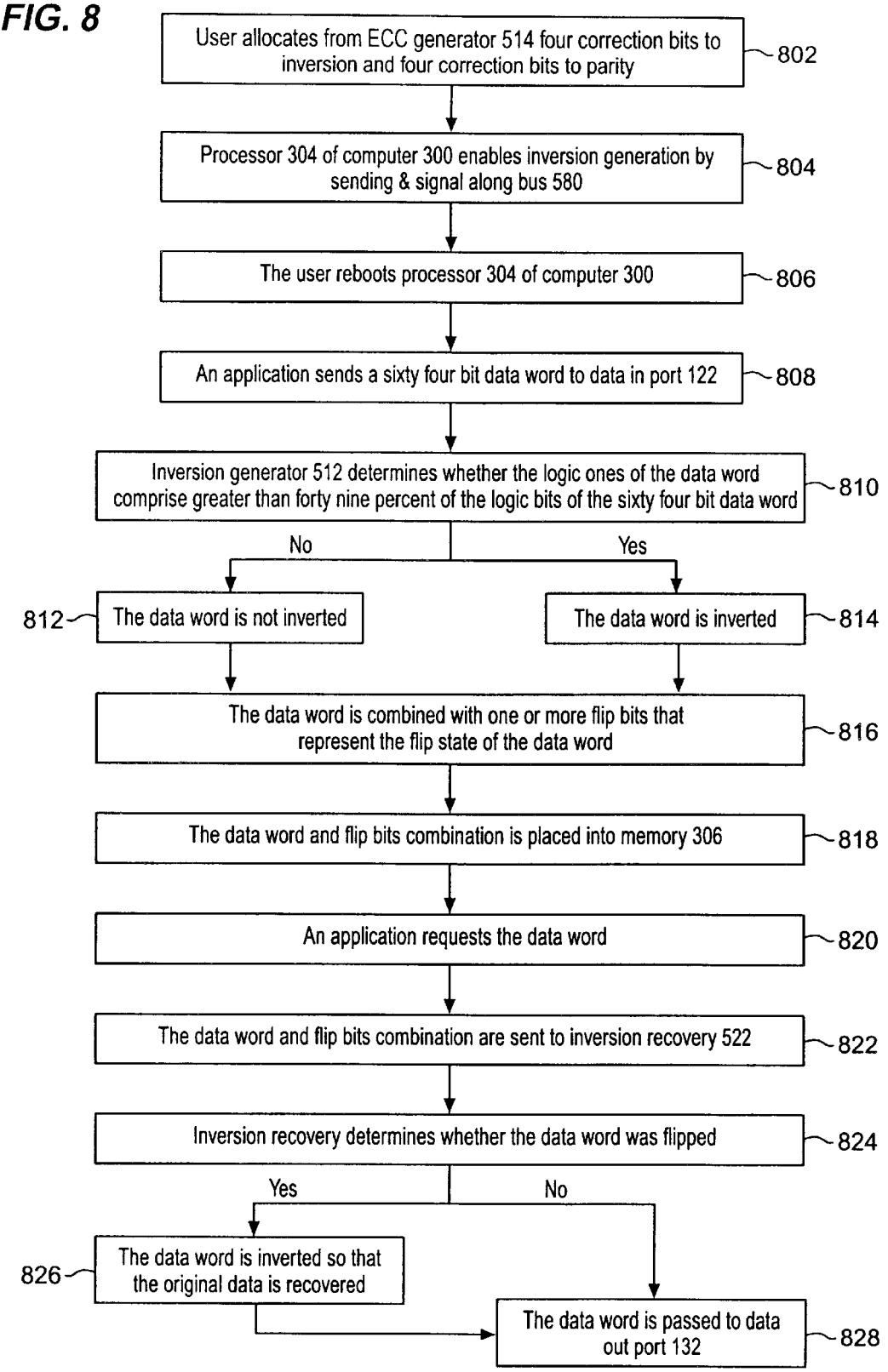
FIG. 8 is a block flow diagram of method 800 of the invention.

FIG. 8 is a block flow diagram of method 800 of the invention. At step 802, the user allocates from ECC generator 514 of FIG. 5 four correction bits to inversion and four correction bits to parity. At step 804, processor 304 of computer 300 enables inversion generation by sending a signal along bus 580 of FIG. 5. At step 806, the user reboots processor 304 of compute 300 of FIG. 5. At step 808, an application sends a sixty four bit data word to data in port 122. At step 810, inversion generator 512 determines whether the logic ones of the data word comprise greater than forty nine percent of the logic bits of the sixty four bit data word. This may be done by determines whether the logic ones of the data word comprise greater than fifty percent of the logic bits of the sixty four bit data word.

If the data word does not comprise greater than forty nine percent of the logic bits of the sixty four bit data word, method 800 proceeds to step 812. At step 812, the data word is not inverted and method 800 proceeds to step 816. If the data word does comprise greater than forty nine percent of the logic bits of the sixty four bit data word, method 800 proceeds to step 814. At step 814, the data word is inverted and method 800 proceeds to step 816.

At step 816, the data word is combined with one or more flip bits that represent the flip state of the data word. At step 818, the data word and flip bits combination is placed into memory 306.

At step 820, an application request the data word.

At step 822, the data word and flip bits combination are sent to inversion recovery 522. At step 824, inversion recovery determines whether the data word was flipped. If the data word was not flipped, method 800 proceeds to step 828. If the data word was flipped, method 800 proceeds to step 826. At step 826, the data word is inverted so that the original data is recovered and method 800 proceeds to step 828. At step 828, the data word is passed to data out port 132 of FIG. 5.

Method 800 may be implemented in a computer readable storage medium containing executable computer program instructions which when executed cause computer system 300 to perform method 800. Also, method 800 may be implemented in a distributed readable storage medium containing executable computer program instructions which when executed cause I/O processor 304 to perform method 800.

The exemplary embodiments described herein are provided merely to illustrate the principles of the invention and should not be construed as limiting the scope of the subject matter of the terms of the claimed invention. The principles of the invention may be applied toward a wide range of systems to achieve the advantages described herein and to achieve other advantages or to satisfy other objectives, as well.

What is claimed is:

1. An inversion generator, comprising:
    an input coupled to a power-on logic state (POLS) bus that receives a data signal from said POLS bus;
    a logical ones detector coupled to said input;
    an XOR array coupled to said input that generates an inverted data signal if said logical ones detector detects that more than a predetermined number of bits of said data signal has a logical one value; and
    an output coupled to said logical ones detector and said XOR array.

2. The inversion generator of claim 1, further comprising:
    a second logical ones detector coupled to said input and said output; and
    a second XOR array coupled to said input and said output.

3. The inversion generator of claim 1, wherein a second input of said XOR array is coupled to a first output of said logic ones detector, a second output of said logic ones detector is coupled to an output of said XOR array, and wherein said output of said inversion generator is integrated with said output of said XOR array and said logic ones detector.

4. A computer system, comprising:
    a processor;
    a memory;
    a power-on logic state (POLS) bus coupled to said processor, said POLS bus having a data signal; and
    an inversion generator having an input coupled to said POLS bus and having an output to form an inverted data signal output if more than a predetermined number of bits of said data signal have a first logic value.

5. The computer system of claim 4, wherein said inversion generator comprises an XOR array having a first input coupled to said input of said inversion generator and coupled in parallel with an input of a logic ones detector.

6. The computer system of claim 5, wherein said XOR array comprises a second input coupled to a first output of said logic ones detector, and an XOR output coupled to a second output of said logic ones detector.

7. The computer system of claim 6, wherein said output of said inversion generator is integrated with said XOR output of said XOR array and said second output of said logic ones detector.

8. The computer system of claim 4, further comprising an inversion recovery having an input coupled to said output of said memory and an output coupled to said processor.

9. The computer system of claim 8 wherein said inversion recovery comprises an XOR array having a first input coupled to said output of said memory and an output coupled to said processor.

10. A method, comprising:
    presenting a data signal on a power-on logic state (POLS) bus;

directing said data signal to an input of an inversion generator, said input of said inversion generator coupled to said POLS bus;

determining if more than a predetermined number of bits of said data signal have a first logic value; and if so, passing said data signal through said inversion generator to form an output signal.

11. The method of claim 10, wherein passing said data signal through said inversion generator further comprises passing said data signal through an XOR array and a logic one detector.

12. The method of claim 11, wherein passing said data signal through said inversion generator further comprises:

directing said data signal to an input of said logic ones detector coupled to said POLS bus;

directing said data signal to an input of said XOR array coupled to said POLS bus; and combining an output signal of said XOR array and an output signal of said logic ones detector to form an inverted data signal.

13. The method of claim 12, further comprising:

directing said inverted data signal to an inversion recovery coupled to said inversion generator; and recovering said data signal from said inverted data signal by passing said inverted data signal through said inversion recovery.

14. The method of claim 13, wherein directing said inverted data signal to an inversion recovery coupled to said inversion generator includes:

directing said inverted data signal to a memory coupled to said inversion generator and directing said inverted data signal from said memory to said inversion recovery.

15. The method of claim 10, further comprising:

directing said output data signal to an inversion recovery coupled to said inversion generator; and recovering said data signal from said output data signal by passing said output data signal through said inversion recovery.

16. The method of claim 15, wherein directing said output data signal to an inversion recovery coupled to said inversion generator includes:

directing said output data signal to a memory coupled to said inversion generator; and directing said output data signal from said memory to said inversion recovery.

* * * * *